(12) United States Patent
Raymond

(10) Patent No.: US 6,443,234 B1
(45) Date of Patent: Sep. 3, 2002

(54) BULBOUS ONION HARVESTER AND TRIMMER

(76) Inventor: Robert Raymond, 4921 Venuto Way, Sacramento, CA (US) 95841

( * ) Notice: Subject to any disclaimer, the term of this patent is extended or adjusted under 35 U.S.C. 154(b) by 0 days.

(21) Appl. No.: 09/778,120

(22) Filed: Feb. 5, 2001

Related U.S. Application Data

(60) Provisional application No. 60/180,349, filed on Feb. 4, 2000.

(51) Int. Cl.$^7$ ............................................. A01D 27/00
(52) U.S. Cl. .......................... 171/31; 171/42; 56/327.1; 56/121.44; 56/12.5
(58) Field of Search .............................. 171/40, 41, 31, 171/29, 26, 42; 56/121.44, 12.5, 16.4 A, 16.4 R, 16.5, 12.8, 327.1; 30/276, 263, 264

(56) References Cited

U.S. PATENT DOCUMENTS

| | | | |
|---|---|---|---|
| 765,505 A | * | 7/1904 | Moulton |
| 1,283,810 A | * | 11/1918 | Kuky |
| 4,166,505 A | * | 9/1979 | West |
| 6,062,009 A | * | 5/2000 | Caillouet |
| 6,073,701 A | * | 6/2000 | Kleinemenke |

* cited by examiner

Primary Examiner—Victor Batson
(74) Attorney, Agent, or Firm—Harold D. Messner

(57) ABSTRACT

In a field harvester and trimmer for root crops having foliage tops growing from the crowns of the crop to be harvested and trimmed, such as large bulbous onions, turnips, parsnips and rutabagas, consisting of a movable vehicle having at least a forward mounted severing and lifting mechanism and trimmer, the improvement comprising a series of rotating and caged flail drum sub-assemblies for trimming the foliage tops and roots of the gathered crop the results of which is a surprisingly enhanced trimmed state. In accordance with the invention, the series of caged, rotating flail drum sub-assemblies of the invention each includes independently rotating dissectable cylindrical cage circumferenential of a series of transverse knives mounted on a central, independently driven shaft. The cylindrical cage includes a side wall preferably provided with a plurality of slots defining major axes of symmetry substantially transverse to axis of rotation of the central driven shaft. When tops or roots of the gathered crop penetrate the slots, only the tip portions of the knives are adapted to contact such tops or roots thereby defining a maximum cutting solid of rotation centered at a selected, constant radial distance from the axis of rotation of the central shaft. Result: a surprising rapid harvesting and trim rate.

16 Claims, 8 Drawing Sheets

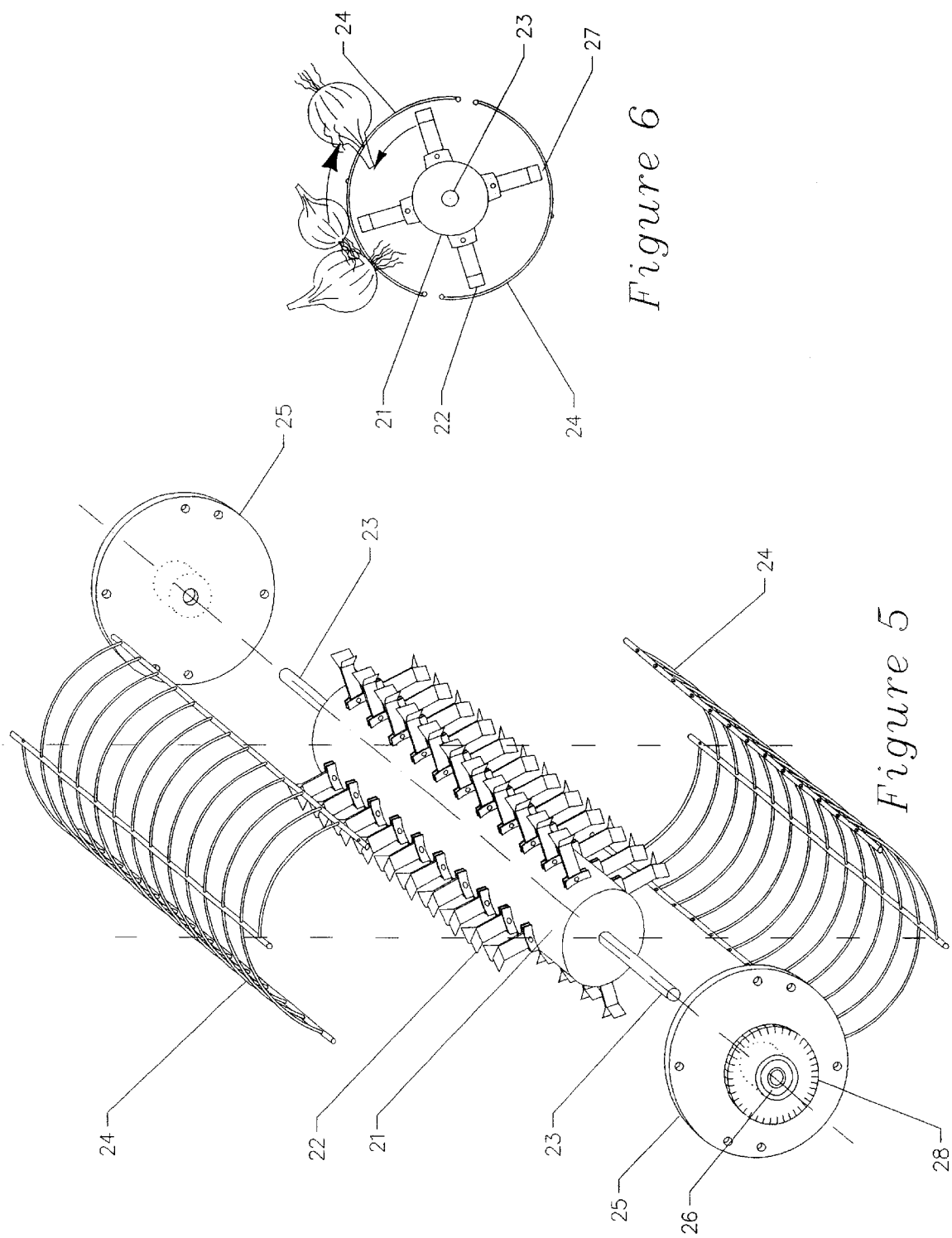

BULBOUS ONION HARVESTER AND TRIMMER

RELATED APPLICATION

This is a continuation of Ser. No. 60/180,349 filed Feb. 4, 2000 for "BULBOUS ONION HARVESTER AND TRIMMER".

SCOPE OF THE INVENTION

The present invention relates to a harvester and a flail trimmer for large bulbous onions which also can be used on similarly shaped root crops such as turnips, parsnips and rutabagas. More particularly, the invention—in one aspect—comprises the steps of withdrawing the onions from earth after rough cutting their foliage tops and roots, conveying them up an incline to a cleaning station and thence to a first location where both—surprisingly—remaining foliage tops and roots are serially trimmed by tumbling them over a series of rotating and caged flail drum sub-assemblies which then deposits them in a surprisingly enhanced trimmed state at a second location spaced a lineal distance from the first location. In accordance with another aspect, the series of caged, rotating flail drum sub-assemblies of the invention each includes independently rotating cylindrical cage circumferenential of a series of transverse knives mounted on a central, independently driven shaft. The cylindrical cage includes a side wall provided with a plurality of slots defining major axes of symmetry that are substantially transverse to axis of rotation of the central driven shaft. When remaining tops or roots penetrate the slots, only the tip portions of the knives are adapted to contact the tops or roots at a selected, constant radial distance from the axis of rotation of the central shaft thereby creating a maximum cutting solid of rotation for such knives. Result: a surprising rapid harvesting and trim rate.

BACKGROUND OF THE INVENTION

Experience has shown a plethora of harvester and trimmers for use in harvesting and trimming vegetables. One such apparatus is described in U.S. Pat. No. 4,182,420 for "ROOT CROP HARVESTER AND TRIMMER" in which a series of endless belts are stacked above and below a orienting zone which positions the roots of the crop, viz., carrots, in positions normal to a particular set of belts whereupon trimming knives trim in a plane parallel to the plane of the belts. Another apparatus is described in U.S. Pat. No. 5,431,231 for "HARVESTER FOR ROOT VEGETABLES" in which the roots are trimmed after being gathered by a crawler type harvester by a stalk cutter after being correctly oriented by a pair of guide discs. In these apparatuses both foliage tops and tops are not trimmed. Still another apparatus is described in U.S. Pat. No. 3,989,110 for "GREEN ONION HARVESTER" in which the lower leaves of the green onions are removed by bruising them between sets of belts after the green onions are removed from the soil using a plurality of blades. Such an apparatus is not suitable for use in harvesting and trimming large bulbous onions.

In many parts of the country, onions have been successfully harvested by machine for some time. Although many attempts have been made to mechanically harvest the short-day onions grown in the southern U.S., primarily in south Texas, none has yet proven acceptable to the growers and shippers. These onions are usually planted in the early Fall, grow over the mild southern winter, and are ready for harvest early in the Spring. At harvest time the onions still have actively growing green tops, although some of them may have fallen down, and a robust root system. In addition, these short-day onions are harvested at a time when they are rather low in solids, and thus are more susceptible to bruising and mechanical damage than onions grown in northern locations which are harvested in Summer and early Fall.

The Federal Specifications for shipping onions require that 90% of the roots and tops be trimmed within one inch of the bulb of the onion. To meet these specs, hand crews are utilized to pull and clip the onions. This is arduous and tiring work, especially on those afternoons in the Spring that top out in the upper 90s Fahrenheit. For this and other reasons, it is becoming increasingly difficult for the growers to assemble crews large enough to meet the rapid harvesting schedule of these short day onions.

Thus there is incentive for growers to consider the possibility of harvesting their onions by machine. The difficulty of mechanically trimming the green tops and heavy root systems of these short-day onions to meet these Federal Specifications has been the major challenge in developing a mechanical harvester. The present invention meets and overcomes that challenge.

In addition to the prior art previously mentioned, note these additional attempts of which I am aware to trim tops and roots of onions which fall into three broad categories.

1. A conveying system which lifts the onions out of the ground and conveys them under a vacuum with sufficient strength to lift the tops upright while the weight of the onions holds them down against the conveyor. Immediately behind the vacuum is a sickle cutter which cuts the tops off and blows them back onto the field, leaving the onions to remain on the conveyor where they are delivered to other conveyors for hand sorting and then loading into trailers being pulled alongside the harvester.

This system has some major drawbacks. (a) The length of the cut tops is quite random. (b) Often smaller onions will be sucked up too high and be torn up by the sickle cutter. (c) And the roots are not trimmed at all. (d) Some of the green tops would be heavy enough that they would not be picked up at all.

2. A system where onions are delivered to a flat table that may have a slight tilt to it and/or may be vibrating to urge the onions to move along in the desired direction. The table will have a series of holes, approximately 1-½ inches in diameter, through which the roots and tops will protrude from time to time. Underneath this table, and in close proximity to its underneath side will be a series of rotating knives, like power lawnmower blades. When the roots or top of an onion protrude(s) through a hole which is over the cutting edge of one of the knives it will be cut off.

The limitations of this system are (a) Inefficient use of the surface area of the table. Assuming a 30 inch diameter blade with 3 inches of cutting edge at the tips, and fitting the maximum number of 1.5 inch diameter holes in the table over the area swept by those cutting edges, only 19% of the table area is available for trimming. Using 15 inch diameter blades with 3 inch cutting edges (a generous assumption) the area of the table where trimming can occur only increases to 33%. (b) When onions pass over this trimming table en masse, as they should to achieve adequate throughput, they often are pushed along without tumbling. When they don't tumble there is no opportunity for the roots or tops to stick through the holes and get trimmed off. Some experimenters have partially overcome this problem by hanging oscillating rubber fingers over the onions to urge them to tumble across the table. (c) Much of the cut plant material builds up on the structure that is required beneath the table to support the motors or pulleys that drive the blades.

3. A system similar to number 2 above with 1.5 inch wide slots in the table, running parallel to the direction the onions are traveling, instead of the 1.5 inch diameter holes. The same limitations apply, however.

SUMMARY OF THE INVENTION

In a field harvester and trimmer for root crops having foliage tops growing from the crowns of the crop to be harvested and trimmed, such as large bulbous onions, turnips, parsnips and rutabagas, consisting of a movable vehicle having at least a forward mounted severing and lifting mechanism and trimmer, the improvement comprising a series of rotating and caged flail drum sub-assemblies for trimming the foliage tops and roots of the gathered crop the results of which is a surprisingly enhanced trimmed state. In accordance with the invention, the series of caged, rotating fail drum sub-assemblies of the invention each includes independently rotating cylindrical cage circumferential of a series of transverse knives mounted on a central, independently driven shaft. The cylindrical cage includes a side wall provided with a plurality of slots defining major axes of symmetry that are substantially transverse to axis of rotation of the central driven shaft. When remaining tops or roots penetrate the slots, only the tip-portions of the knives are adapted to contact the tops or roots at a selected, constant radial distance from the axis of rotation of the central shaft thereby creating a maximum cutting solid of rotation for such knives. Result: a surprisingly rapid harvesting and trim rate.

BRIEF DESCRIPTION OF THE DRAWINGS

FIG. 5 is an exploded detail of a caged flail drum sub-assembly;

FIG. 6 is a side view of the caged flail drum sub-assembly of FIG. 5;

DETAILED DESCRIPTION OF THE INVENTION

FIG. 1.

Figure 1:
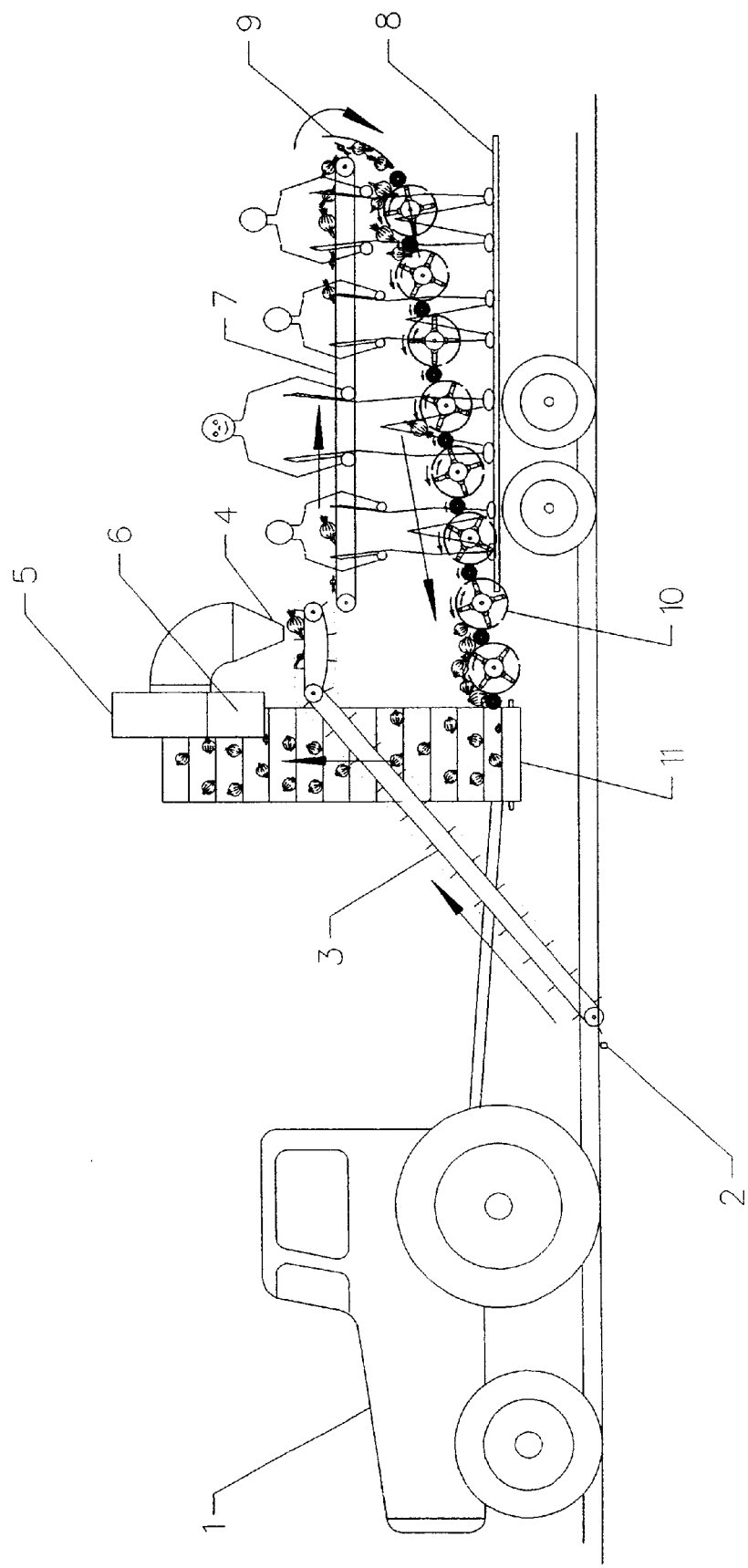
FIG. 1 is a side view of the harvester—partially schematic—the invention.

FIG. 1. shows a side schematic view of a proposed configuration of the harvester. The harvester is pulled through the field by a tractor (1) which also provides power to the harvester through its Power Take Off and a hydraulic pump driven by its engine. A rod weeder (2) is rigidly mounted to the frame of the gathering chain (3). The rod weeder (2) is a square rod, approximately 1.5 inches on a side, that is powered to rotate approximately 100 RPM, and travels approximately 6 inches underground, at a 90 degree angle to the direction of travel. This rotating, traveling motion loosens the dirt, facilitating the lifting of the onions out of the ground. Directly behind the rod weeder (2) is a conventional hook-link gathering chain (3). This chain is made of steel rods approximately ½ inch in diameter that are spaced so that there is about an inch gap between the rods. The gathering chain (3) moves along directly behind the rod weeder (2), 6 to 8 inches below the level of the top of the bed. The chain lifts the onions out of the ground and elevates them into the body of the harvester. The arrows indicate the path the onions follow through the harvester. Loose dirt and small bits of chopped green tops and weeds fall through the gaps in the chain (3) back to the ground.

The onions then pass under the vacuum snout (4) of a radial blade blower (5) where more loose chopped material is sucked off and discharged back to the field through the blower outlet (6). The onions are then delivered to two flat belt conveyors (7), one on each side of the harvester, on which they are moved toward the rear of the harvester. A platform (8) is provided for personnel as needed to inspect and sort the onions as they pass by on conveyors (7), throwing out any bad onions and clods or other trash.

The onions are then discharged onto a ramp (9), where they fall a short distance onto a Caged Flail Drum Trimmer (10), located below the conveyors (7). The Caged Flail Drum Trimmer (10), consisting of a series of Caged Flail Drum Sub-assemblies described in detail in FIGS. 5, 6, 7, and 8, moves the onions toward the front of the machine while trimming the roots and tops of the onions at the same time. The Caged Flail Drum Trimmer (10) discharges the trimmed onions onto a Cross Conveyor (11) which carries them across the machine and up an Elevator (12) for loading into a trailer or truck being pulled alongside the harvester.

FIG. 2.

Figure 2:
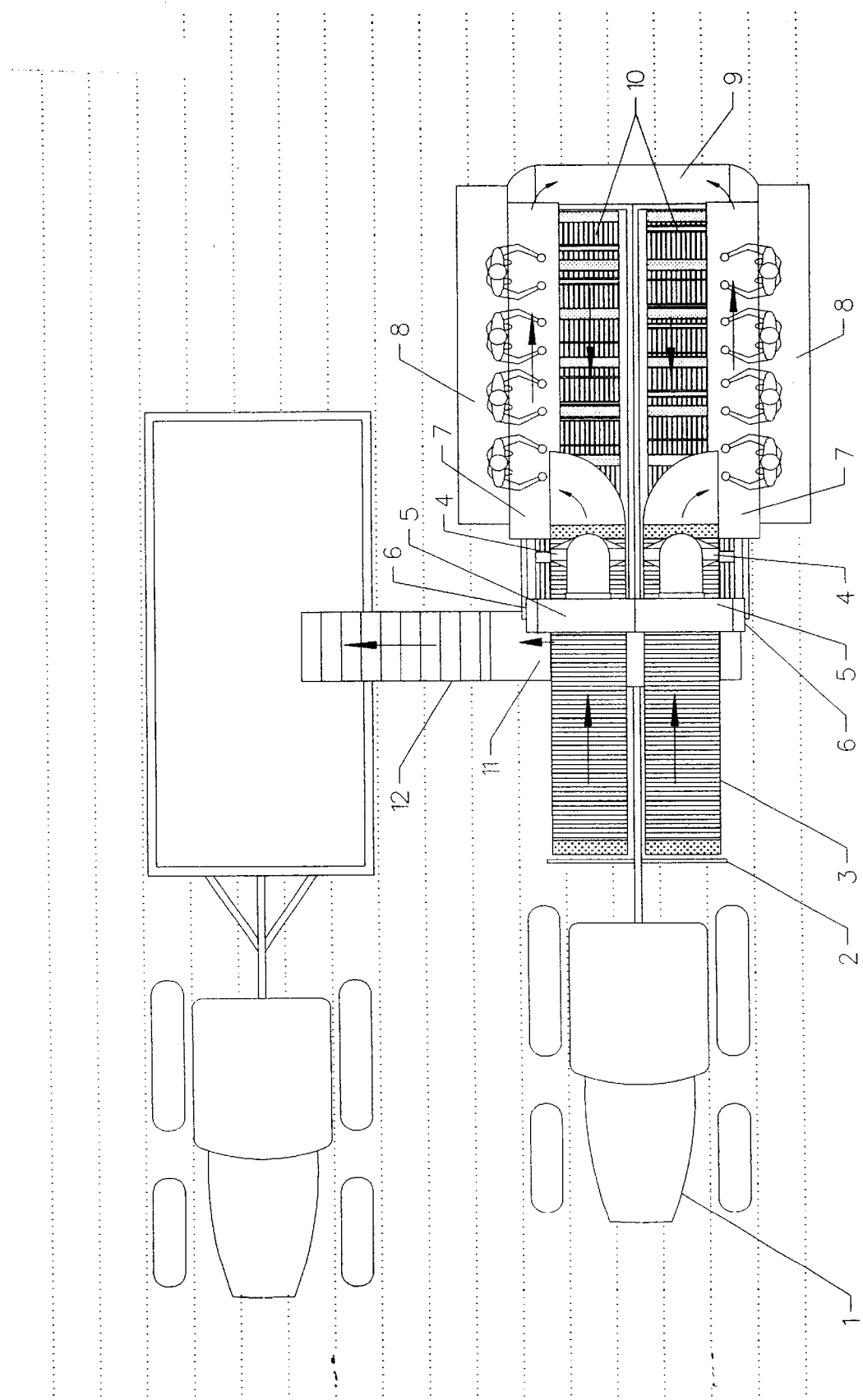
FIG. 2 is a top view of the harvester of FIG. 1.

FIG. 2. is a top view of the harvester of the configuration of FIG. 1. The components have the same numbers as in FIG. 1. A safety hatch cover over the Caged Flail Drum Trimmer (10) is not shown in any of these figures.

FIGS. 3 & 4.

Figure 3:
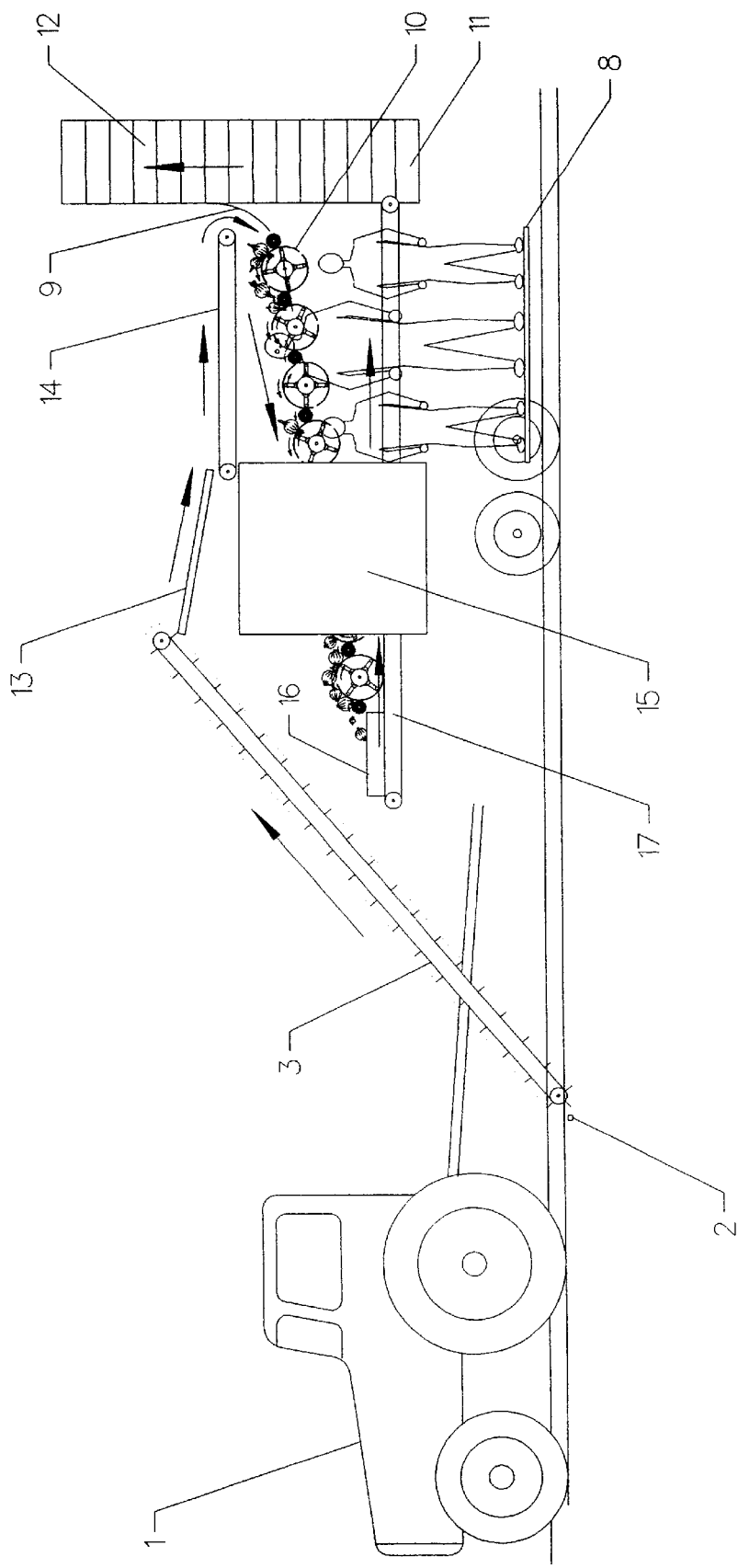
FIG. 3 is a side view of an alternative embodiment of the invention.
Figure 4:
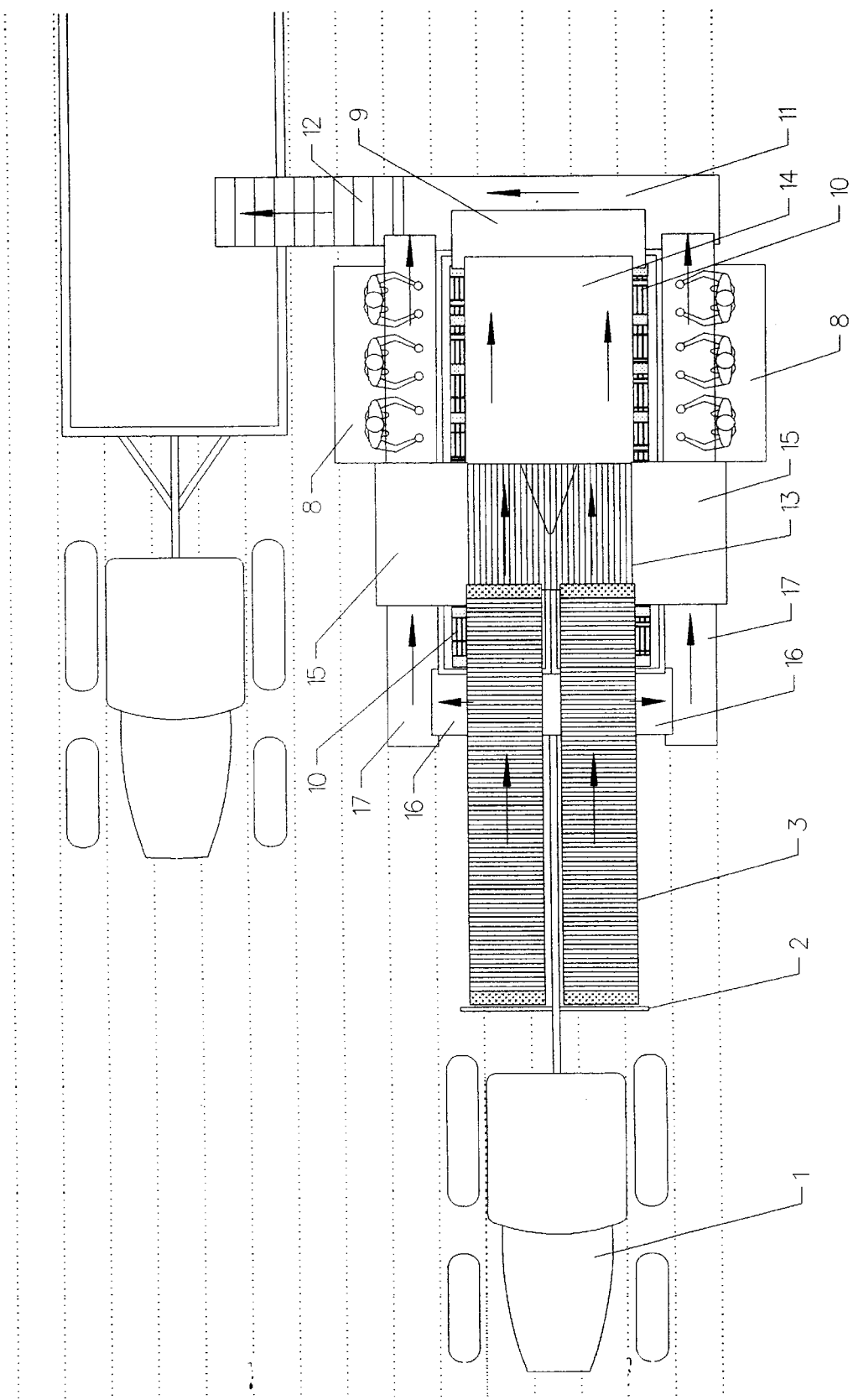
FIG. 4 is a top view of the embodiment of FIG. 3.

FIG. 3. is a side schematic view of an alternate configuration of the harvester. The numbers of the components are the same as in FIG. 1 with the following exceptions: Items 4, 5, 6, & 7 are not found in this configuration. The Vacuum Fan, 4, 5, & 6 is replaced by a bed of Cleaning Rolls (13) described on U.S. Pat. No. 4,240,446 Vine Crop Harvester, Robert Raymond, Inventor. This Bed (13) consists of closely spaced, counter rotating cylindrical rolls that pull the loose trash and plant material down through the bight of the rolls and deposits it on the peaked roof like Slide (15). The Slide (15) directs this material back to the ground on each side of the harvester. The direction of rotation of the rolls in the Bed (13) is reversed every few seconds so that no long stringy material can wind around the rolls; thus the rolls are self cleaning. After passing over these Cleaning Rolls (13), the onions roll onto a flat belt Conveyor (14) which moves them toward the rear of the harvester where they are deposited onto a Ramp (9) as in FIGS. 1 & 2. The onions then are carried toward the front of the harvester by the Caged Flail Drum Trimmer (10) and deposited on a Split Conveyor (16). Split Conveyor (16) divides the flow of onions, sending one half to one side of the machine and the other half to the opposite side of the harvester. Each stream of onions then rolls onto flat belt Conveyor (17) which moves them toward the rear of the harvester, past an inspection station where sorters stand on Platform (8). The onions are then deposited onto Conveyor (11) which moves them to Elevator (12) for loading into the trailer or truck being pulled alongside.

FIG. 5.

FIG. 5. is an exploded view of one of the Caged Flail Drum Sub-assemblies that make up the Caged Flail Drum Trimmer, Item (10) in the previous drawings. A Flail Drum (21), sometimes called a reel, with conventional "fine cut" Blades (22) attached rotates at high speed around Stub Shafts (23). Stub Shafts (23) are supported by ball bearings (not shown) attached to the framework of the harvester. Cylindrically shaped Cages (24) surround the Flail Drum and Blades (21 & 22). The inside diameter of the Cages (24) is approximately one inch greater than the diameter of the cylindrical space defined by the tips of the Blades (22) as they swing around the Drum (21). Thus there is approximate a one half inch Annular Gap (27) between the Blades (22) and the Cages (24).

Cages (24) are supported at their ends by End Plates (25) which rotate freely on Bearings (26) around, and supported by, Stub Shafts (23). The End Plates (25) are independently driven by a rigidly attached sprocket or sheave (28) at a low speed, perhaps 60 RPM. There is approximately a one and one half inch gap between the individual hoops of the Cages (24).

FIG. 6.

Figure six is an end view of a Caged Flail Drum Sub-assembly with the Cages (24) in their proper position, and with the End Plates not shown. As onions roll over the Cages (24) their roots and stems periodically protrude through the gaps in the Cages (24) and are cut off by the Blades (22).

Figure 7:
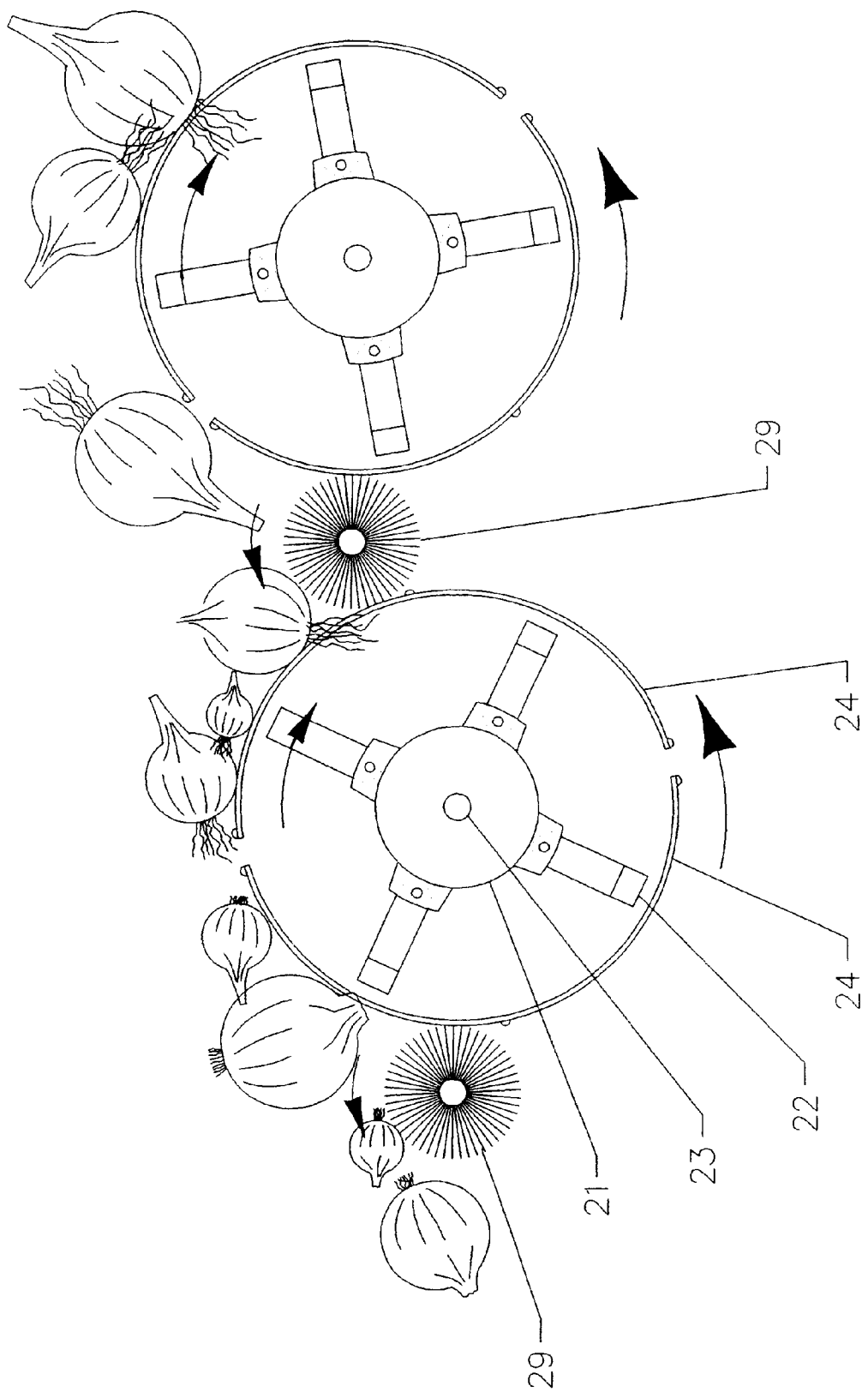
FIG. 7 is a side view of a pair of side-by-side sub-assemblies of FIG. 6 with the addition of a cylindrical brush between them.

FIG. 7 is an enlarged view of two of these Caged Flail Drum Subassemblies separated by a rotating cylindrical Brush (29), approximately 5 inches in diameter, and equal in length to the Flail Drum (21). These Brushes (29) rotate in the same direction as, and about three times the RPM of, the Cages (24). The Brushes (29) perform a very important function; they bridge the deep valley between two adjacent Cages in the Caged Flail Drum Trimmer, and clean the onions somewhat as they urge them onward. Early experiments with the Caged Flail Drum Sub-assemblies side by side, with no Brushes in between, allowed the onions to fall into the deep valleys between the Cages, where some of them suffered heavy mechanical damage.

FIG. 7. also shows more clearly how the roots and tops of the onions stick through the gaps between the hoops in the Cages so they can be cut off.

FIG. 8.

Figure 8:
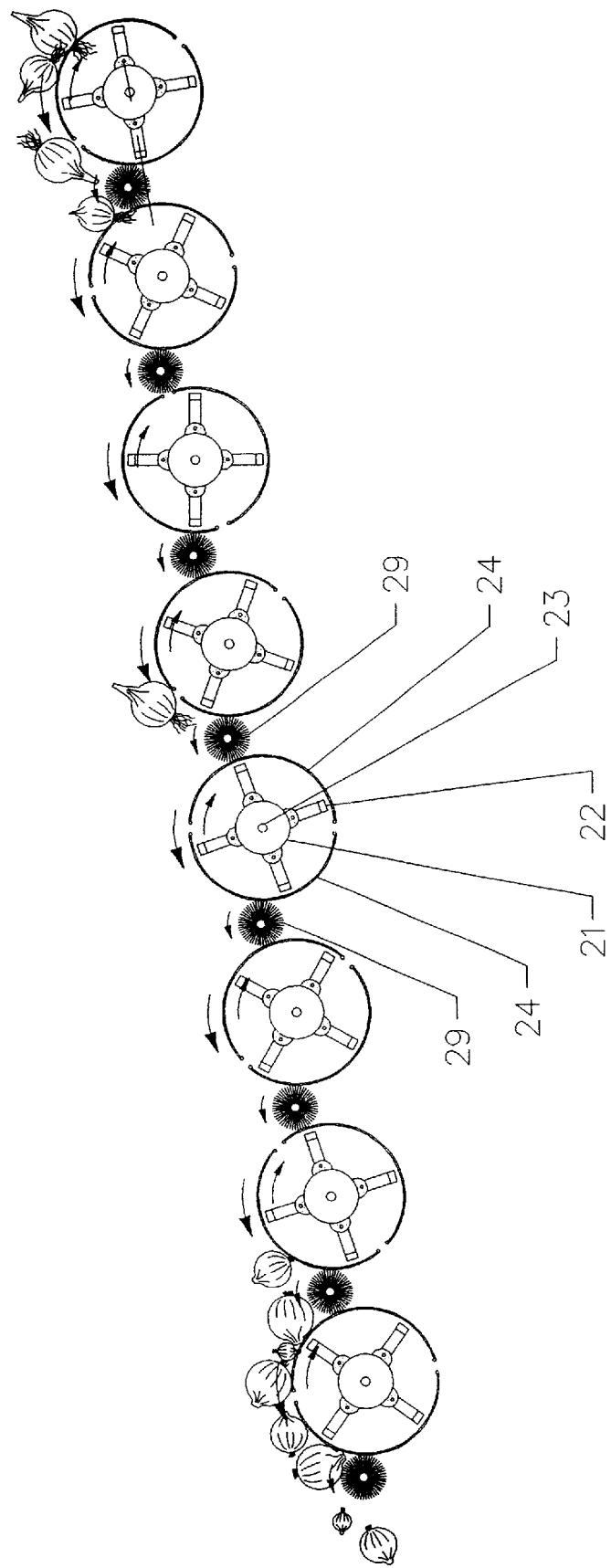
FIG. 8 is a side view of a full plurality of sub-assemblies of the invention.

FIG. 8 shows a full complement of Caged Flail Drum Sub-assemblies mounted side by side, with cylindrical Brushes (29) in between, making up a Caged Flail Drum Trimmer (10). All of the Cages (24), along with the cylindrical Brushes (29) rotate in the same direction, acting as a conveyor to move the onions along in a steady stream. The entire Trimmer may be tilted a few degrees off of the horizontal to enhance the flow of onions. Observations have recorded some onions tumbling as many as 10 or 12 times over the length of the Trimmer, greatly improving the probability that their roots and tops will project through the gaps in the Cages (24) and thus be trimmed off. Taking into account the area covered by the brushes where no trimming can occur, simple calculations show that the onions can present their roots or tops for trimming over as much as 70% of the area covered by the Trimmer, as opposed to a maximum of 33% for the devices cited in Paragraph 3 above. Also, the area beneath the Trimmer is completely open so that the cuttings will fall directly back to the ground. The only obstruction to the fall of this debris is the narrow rods of the Cages. These rods will be Teflon coated to minimize the ability of cut material to build up on them.

FIG. 9.

Figure 9:
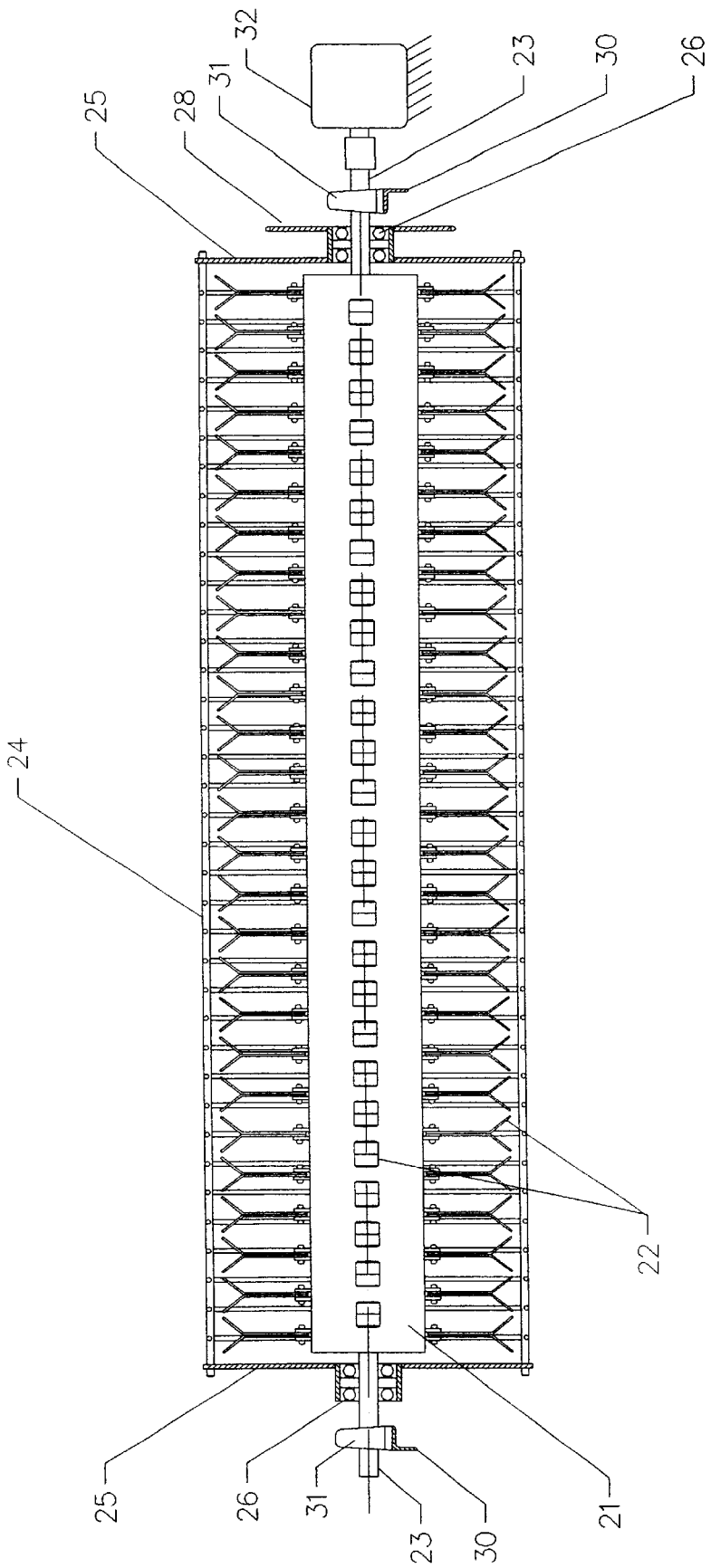
FIG. 9 is a sectional view of caged flail drum sub-assembly of FIGS. 5 and 6.

FIG. 9 is a cut away drawing of a Caged Flail Drum Sub-assembly showing how it can be mounted to the harvester framework (30) through bearings (31). The Flail Drum (21) is turned by a motor (32) or other means at a high RPM. The Cage (24) is affixed to and supported by End Plates (25), which turn freely on Stub Shafts (23). One or both of the End Plates (25) are rotated at a slow RPM by Sprocket or Sheave (28), which is rigidly attached to End Plates (25).

Although the invention has been shown and described with respect to exemplary embodiments thereof, it should be understood by those skilled in the art that the foregoing as well as various other changes, variations, omissions and additions may be made therein and thereto, without departing from the spirit and scope of the invention as defined in the following claims. For example, while the cage is depicted as having a series of slots penetrating its side walls, some of the cages need not be so constructed so long as their surface would be "dissected", viz., having some type of openings with edges, knarls, peaks, valleys, etc., to provide the tumbling action to the onions and permit penetration by the onions.

What is claimed is:

1. A harvester for root vegetables comprising:
   (i) a body,
   (ii) means for supporting and moving said body in a pre-selected travel direction,
   (iii) a severing and lifting mechanism provided on said body for severing and picking up root vegetables,
   (iv) a trimmer in operational contact with said severing and lifting mechanism for trimming off both foliage tops and roots of said root vegetables by application of non-vibratory tumbling action to said root vegetables, comprising at least a rotating and caged flail drum sub-assembly comprising an independently rotating cylindrical cage circumferential of a series of transverse knives mounted on a central, independently driven shaft substantially normal to said pres-selected travel direction of said body.

2. The harvester of claim 1 wherein said cylindrical cage includes a side wall provided with a plurality of slots defining major axes of symmetry that are substantially transverse to an included axis of rotation of said central driven shaft to aid in providing said tumbling action of said root vegetables.

3. The harvester at claim 2 wherein said knives each includes tip portions adopted to be positioned adjacent to said cylindrical cage.

4. The harvester of claim 3 with the addition of a plurality of rotating and caged flail drum sub-assemblies each comprising an independently rotating cylindrical cage circumferential of a series of transverse knives mounted on a central, independently driven shaft positioned substantially normal to said pre-selected travel direction.

5. In a field harvester and trimmer for root crops each having foliage tops growing from crowns of a crop to be harvested and trimmed, including but not limited to large bulbous onions, turnips, parsnips and rutabagas, consisting of a movable vehicle having at least a forward mounted severing and lifting mechanism and more rearward mounted trimmer, the improvement comprising forming said trimmer of a series of rotating and caged flail drum sub-assemblies positioned substantially normal to an operations travel direction of said movable vehicle for trimming foliage tops and roots of a crop to be gathered in sequence through provision of a non-vibratory tumbling action while directing said crop across sectors of said rotating and caged flail drum sub-assemblies.

6. The improvement of claim 5 wherein each of said series of rotating and caged drum sub-assemblies comprises an independently rotating cylindrical cage circumferential of a series of transverse knives mounted on a central, independently driven central shaft.

7. The improvement of claim 6 wherein said cylindrical cage includes a side wall provided with a plurality of slots defining major axes of symmetry that are substantially transverse to an included axis of rotation of said central driven shaft.

8. The improvement of claim 7 wherein said knives each includes tip portions adopted to be positioned adjacent to said cylindrical cage.

9. The improvement of claim 8 with the addition of a series of rotating brushes each positioned at adjacent peripheries of neighboring pairs of said series of rotating and caged drum sub-assemblies.

10. A method of trimming rooted vegetables to an enhanced state, comprising the steps of:
   (i) guiding rooted vegetables to a trimmer traveling in a pre-selected direction and comprising a series of caged flail drum sub-assemblies each mounted transverse to said pre-selected direction and including an independently rotating, dissectable cylindrical cage circumferential of a series of transverse knives mounted on a central, independently driven shaft,
   (ii) independently rotating each cage so as to provide a non-vibratory tumbling action as said rooted vegetables travel across a sector of each cage and pass to an adjacent cage,
   (iii) independently rotating the transverse knives having end portions positioned adjacent to the cages whereby both foliage tops and roots of the rooted vegetables are trimmed after the vegetables have exited from said series of rotating and caged drum sub-assemblies.

11. A method of trimming rooted vegetables to an enhanced state, comprising the steps of:
   (i) guiding rooted vegetables to a trimmer traveling in a pre-selected direction and comprising a series of caged flail drum sub-assemblies each mounted transverse to said pre-selected direction and including an independently rotating, dissectable cylindrical cage circumferential of a series of transverse knives mounted on a central, independently driven shaft,
   (ii) independently rotating the transverse knives having end portions placed adjacent to the cages whereby both foliage tops and roots of the rooted vegetables are trimmed after the vegetables have exited from said series of rotating and caged drum sub-assemblies.

12. The method of claim 11 with the additional step of:
   (iii) independently rotating each cage so as to provide a non-vibratory tumbling action as said rooted vegetables travel across a sector of each cage and pass to an adjacent cage whereby the probability of the foliage tops and roots penetrating the slotted cages is enhanced.

13. For use in trimming rooted vegetables, an article of manufacture comprising at least a rotating and caged flail drum sub-assembly comprising an independently rotating dissectable cylindrical cage circumferential of a series of transverse knives mounted on a central, independently driven shaft.

14. The article of manufacture of claim 13 wherein said cylindrical cage includes a side wall provided with a plurality of slots defining major axes of symmetry that are substantially transverse to an axis of rotation of said central driven shaft.

15. The article of manufacture of claim 14 wherein said knives each includes tip portions adapted to be positioned adjacent to said cylindrical cage.

16. The articles of manufacture of claim 15 with the addition of a plurality of rotating and caged flail drum sub-assemblies each assembly comprising an independently rotating cylindrical cage circumferential of a series of transverse knives mounted on a central, independently driven shaft.

* * * * *